United States Patent Office 3,087,952
Patented Apr. 30, 1963

3,087,952
PROCESS OF MAKING VINYLTHIOETHERS
Donald J. Foster, South Charleston, and Erich Tobler, Charleston, W. Va., assignors to Union Carbide Corporation, a corporation of New York
No Drawing. Filed Apr. 12, 1960, Ser. No. 21,588
8 Claims. (Cl. 260—433)

This invention relates to a new method of making vinyl alkyl and aryl thioethers and to a new class of compounds, vinylmercuric thioethers, which are intermediates in the process.

Vinyl thioethers are monomers of considerable interest but heretofore there have been no fully satisfactory methods for their synthesis. Vinyl alkyl thioethers cannot be prepared in good yields by the reaction of acetylene with the mercaptan because vinyl alkyl thioethers further react with mercaptans. Vinyl ethyl thioether was prepared by the awkward procedure of heating sodium ethyl mercaptan and vinyl bromide in a sealed vessel as reported by Stromholm in Ber., 33, 840 (1900). Vinyl aryl thioethers have been reported by Reppe-type vinylation with acetylene but acetylene under pressure is required as well as elevated temperatures and extended reaction times as noted on page 636 of "Vinyl and Related Polymers" by Schildknecht. Other syntheses have been reported but all have very limited use. Thus, ethylene oxide is taught in U.S. Patent No. 2,402,878 to Doumani to react with mercaptans to yield hydroxyalkyl sulfides which, on heating with sulfuric acid, give low polymers of vinyl thioethers.

We have now discovered that vinyl thioethers may be readily and conveniently prepared in good yields by the reaction of mercaptans or thioaryl compounds with divinylmercury. The reaction takes place at room temperature or at elevated temperatures. An intermediate compound formed during the reaction is a vinylmercuric thioether, which may be isolated if desired. The overall reaction may be represented in two steps by the following equations:

(I) 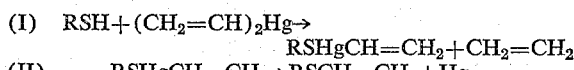
$$RSH + (CH_2=CH)_2Hg \rightarrow RSHgCH=CH_2 + CH_2=CH_2$$

(II) 
$$RSHgCH=CH_2 \rightarrow RSCH=CH_2 + Hg$$

and as a combined reaction by the equation (III) 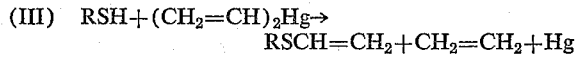
$$RSH + (CH_2=CH)_2Hg \rightarrow RSCH=CH_2 + CH_2=CH_2 + Hg$$

wherein R is an alkyl or aryl group which does not contain an active hydrogen atom.

The rate of the overall reaction III, and hence the degree to which the product of reaction I undergoes reaction II, is controlled by a number of factors. The extent to which the intermediate vinylmercuric thioether has been converted to the final vinyl ether product is indicated by the quantity of free mercury deposited in the reaction. The reaction may be conducted in a solvent or diluent, although a solvent is not necessary. In general the presence of such a solvent or diluent tends to favor reaction I and the production of a vinylmercury thioether intermediate. The absence of solvent or diluent tends to cause reaction III to go to completion with the formation of the vinyl thioether. Apparently the presence of the solvent slows down the reaction. It also promotes more intimate contact with certain types of reactants and retards polymerization.

The solvent or diluent will ordinarily be a relatively low boiling hydrocarbon or ether solvent. Suitable solvents or diluents include aliphatic and aromatic hydrocarbons such as pentane, hexane, heptane, benzene, toluene, xylene, as well as lower aliphatic ethers, tetrahydrofuran, tetrahydrothiophene, dioxane, ethylene glycol diphenyl ether, diethylene glycol diphenyl ether, and the like. Preferred solvents are aliphatic ethers containing from two to twelve carbon atoms such as methyl ether, methyl ethyl ether, ethyl ether, n-propyl ether, isopropyl ether, n-butyl ether, iso-butyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene glycol diethyl ether, diethylene glycol ethyl butyl ether, diethylene glycol dibutyl ether, diethylene glycol ethyl hexyl ether, and the like.

A relatively short reaction time will ordinarily favor reaction I and the intermediate vinylmercuric thioether while a larger reaction time favors reaction III and the vinyl thioether product. Lower temperatures also favor the vinylmercuric thioether intermediate while higher temperatures favor the full reaction and the vinyl thioether product. With respect to temperatures it has also been found that alkyl thioethers in general require higher temperatures in the reaction than do aryl thioether. In most cases reaction I will commence to some degree at room temperature. When reaction III is desired the only upper limit on the temperature is the decomposition or polymerization of the reactants or product. When it is desired to recover the vinylmercuric thioether and form reaction I, stoichiometric quantities of reactants should be employed. If reaction III is desired, and the final vinyl thioether product is wanted a stoichiometric excess of divinyl is preferably employed. All of the above reactions are conveniently and efficiently operated at atmospheric pressure, although other pressures could be used if desired. Divinyl mercury can be made by adding mercuric chloride to vinylsodium in a solvent such as butyl ether.

The vinylmercuric thioethers of the invention may be represented by the formula $CH_2=CH-Hg-S-R$ wherein R is an alkyl or aryl group which does not contain an active hydrogen atom. Thus R can be alkyl such as methyl, ethyl, propyl, butyl, amyl, hexyl, heptyl, octyl, nonyl, decyl, undecyl, dodecyl, nonadecyl and the like or substituted alkyl where the substituent does not contain an active hydrogen atom. Also of course R can be aryl such as phenyl or naphthyl or any substituted aryl where the substituent does not contain an active hydrogen atom i.e. halogen-substituted phenyl or naphthyl such as mono-, di- or tri-chloro or bromo phenyl or naphthyl or the like, lower-alkyl substituted phenyl or naphthyl such as mono-, di- or tri-methyl ethyl, propyl or butyl phenyl or naphthyl or the like. R can also be alkenyl.

Typical or vinylmercuric thioethers of the invention include vinylmercuric phenyl thioether, vinylmercuric naphthyl thioether, vinylmercuric chlorophenyl thioether, vinylmercuric bromophenyl thioether, vinylmercuric chloronaphthyl thioether, vinylmercuric bromonaphthyl thioether, vinylmercuric dichlorophenyl thioether, vinylmercuric trichlorophenyl thioether, vinylmercuric dichloronaphthyl thioether, vinylmercuric trichloronapthyl thioether, vinylmercuric methylphenyl thioether, vinylmercuric dimethylphenyl thioether, vinylmercuric trimethylphenyl thioether, vinylmercuric ethylphenyl thioether, vinylmercuric diethylphenyl thioether, vinylmercuric triethylphenyl thioether, vinylmercuric propylphenyl thioether, vinylmercuric dipropylphenyl thioether, vinylmercuric tripropylphenyl thioether, vinylmercuric butylphenyl thioether, vinylmercuric dibutylphenyl thioether, vinylmercuric methylnaphthyl thioether, vinylmercuric dimethylnaphthyl thioether, vinylmercuric trimethyl naphthyl thioether, vinylmercuric ethylnaphthyl thioether, vinylmercuric diethylnapthyl thioether, vinylmercuric triethylnaphthyl thioether, vinylmercuric propylnaphthyl thioether, vinylmercuric dipropylnaphthyl thioether, vinylmercuric tripropylnaphthyl thioether, vinylmercuric butylnaphthyl thioether, vinylmercuric dibutylnaphthyl thioether and the like. Also typical are straight and branched chain alkyl thioethers such as vinylmercuric methyl thioether, vinylmercuric ethyl thioether, vinylmercuric propyl thioether, vinylmercuric butyl thioether, vinylmercuric amyl thioether, vinylmercuric hexyl thioether, vinylmercuric heptyl thioether, vinylmercuric octyl thioether, vinylmercuric nonyl thioether, vinylmercuric decyl thioether, vinylmercuric undecyl thioether, vinylmercuric lauryl thioether, vinylmercuric dimethylpentyl thioether, vinylmercuric ethylhexyl thioether, vinylmercuric nonodecyl thioether and the like.

In general, the vinylmercuric thioethers of the invention are crystalline solids soluble in common organic solvents such as benzene, petroleum ether, alcohols, acetone and the like. They are of course valuable as a source of vinyl thioethers which they yield upon heating. They are also potent fungicides and can be used as antifungicide additives for oil paints by adding them in the amount of 2 to 10 parts per million. They are also useful in preventing fungus attack on paper pulp prior to processing it into paper.

*Example I*

A mixture containing 25.5 grams (0.1 mol) of divinylmercury and 20.3 grams (0.1 mol) of laurylmercaptan was heated to a temperature of 110° C. for a period of three hours. During this reaction period ethylene was evolved and metallic mercury was deposited. On cooling the residue solidified and it was recrystallized from a mixture of ethanol and chloroform. The waxy solid, vinyl lauryl thioether, was recrystallized several times and finally dried in vacuo (one millimeter) at a temperature of 40° C. for 30 hours. The product melted at a temperature of 50–51° C. The infrared spectrum was consistent with the assigned structure. The following elemental analysis was obtained:

*Analysis.*—Calc'd. for $C_{14}H_{28}S$: C, 73.62; H, 12.36; S, 14.02. Found: C, 73.68; H, 12.61; S, 14.5. The yield amounted to 70 percent of the theoretical.

*Example II*

To 25.5 grams (0.1 mol) of divinylmercury was added dropwise, at room temperature 11.0 grams (0.1 mol) of thiophenol. An exothermic reaction commenced immediately with the accompanying evolution of ethylene and the deposition of metallic mercury. After the initial reaction subsided, the reaction mixture was warmed on a steam bath for 0.5 hour at a temperature of about 90° C. to complete the reaction. The metallic mercury was removed from the reaction mixture and on cooling the supernatant liquid deposited 16.2 grams of solid product which was subsequently identified as vinylmercuric phenyl thioether. This material melted at 64–67° C. In addition to the mercury containing thioether, four grams of vinyl phenyl thioether was obtained by distillation of the residue. The latter product boiled at a temperature of 60° C. under a reduced pressure of one mm. The physical and chemical properties of this distillate were identical with an authentic sample of vinyl phenyl thioether. Subsequent heating of vinylmercuric phenyl thioether to a temperature of 130° C. produced mercury and vinyl phenyl thioether. The overall yield of divinylmercury and thiophenol to vinyl phenyl thioether is in excess of 70 percent of the theoretical.

*Analysis.*—Calc'd. for $C_8H_8HgS$: C, 28.59; H, 2.38; S, 9.53. Found: C, 28.54; H, 2.1; S, 9.6.

What is claimed is:

1. Process for making vinylmercuric thioethers which comprises reacting about a stoichiometric quantity of divinylmercury with compounds of the formula R—S—H wherein R is selected from the group consisting of alkyl and aryl groups which do not contain active hydrogen atoms.
2. Vinylmercuric phenyl thioether.
3. Vinylmercuric naphthyl thioether.
4. A vinylmercuric halophenyl thioether.
5. A vinylmercuric halonaphthyl thioether.
6. A vinylmercuric alkylphenyl thioether.
7. A vinylmercuric alkylnaphthyl thioether.
8. Vinylmercuric aryl thioethers wherein the aryl group does not contain an active hydrogen atom.

References Cited in the file of this patent

UNITED STATES PATENTS

| | | |
|---|---|---|
| 2,607,790 | Sowa | Aug. 19, 1952 |
| 2,883,407 | Flenner | Apr. 21, 1959 |
| 2,883,408 | Flenner | Apr. 21, 1959 |
| 2,883,409 | Flenner | Apr. 21, 1959 |
| 2,903,484 | Hardy et al. | Sept. 8, 1959 |
| 2,910,508 | Bloch et al. | Oct. 27, 1959 |

OTHER REFERENCES

Chem. Soc. Proceedings, 1958, p. 116.